(No Model.)
C. E. HUDSON.
SLICING AND CORING KNIFE FOR APPLE PARERS.
No. 377,106. Patented Jan. 31, 1888.
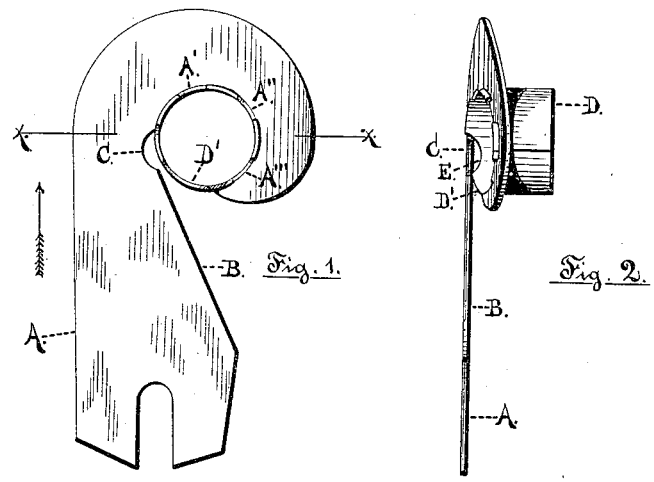
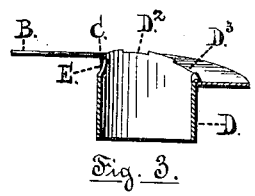
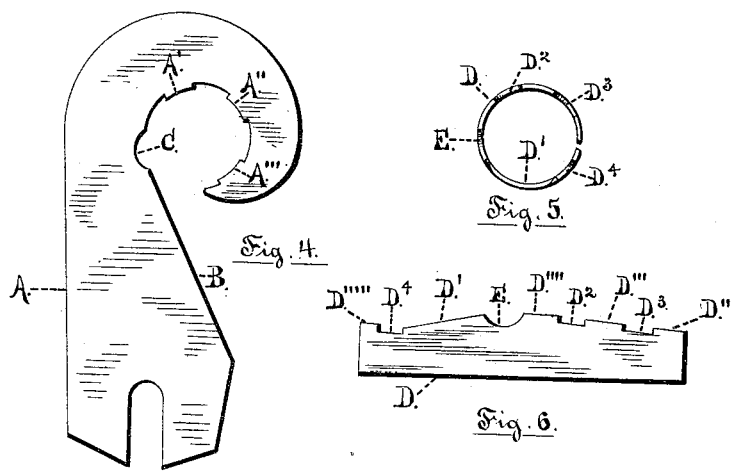
Witnesses:
Inventor:
Chas. E. Hudson

UNITED STATES PATENT OFFICE.

CHARLES E. HUDSON, OF LEOMINSTER, MASSACHUSETTS.

SLICING AND CORING KNIFE FOR APPLE-PARERS.

SPECIFICATION forming part of Letters Patent No. 377,106, dated January 31, 1888.

Application filed June 16, 1887. Serial No. 241,461. (No model.)

*To all whom it may concern:*

Be it known that I, CHARLES E. HUDSON, a citizen of the United States, residing at Leominster, in the county of Worcester and State of Massachusetts, have invented a new and useful Improvement in Slicing and Coring Knives for Apple-Paring Machines, of which the following is a specification.

My invention relates to that class of apple-paring machines that slice the apple and take out the core at the same time, the knives operating upon the fruit by the rotary motion of the fruit against the cutting-edges.

The object of my invention is to provide a cheap, easily-made, and effective combined slicing-knife, core-cutter, and core-guard, to which end my invention consists in a slicing-knife with an extended upper end curved to partially encircle the core, and bent or twisted in the form of a screw-thread to fit within the spiral cut made by the slicing-knife and provided with a solid metallic core guard having a portion of its inner edge sharpened to act in cutting the core from the apple by the rotary movement of the apple.

Another feature of my invention is to provide means to prevent the seeds of the apple from clogging or becoming caught in the crevice at the junction of the coring tube or guard and the slicing-knife. This I accomplish by providing either the coring tube or guard, or the slicing-knife, or both, with a recess or cut-away portion at or near the connecting-point of the sharpened portion of the core-guard with the sharpened edge of the slicing-knife.

Another feature of my invention relates to the manner of fastening the core-guard and core-cutter to the slicing-knife blade, and which I will describe more fully later on.

In the accompanying drawings, Figure 1 is a side elevation of my improved slicing and coring knife; Fig. 2, an edge view of Fig. 1, looking in the direction of the line $x\ x$ in Fig. 1; Fig. 3, a sectional view on line $x\ x$ and looking in the direction of the arrow, Fig. 1; Fig. 4, a plan view of the slicing-knife blank; Fig. 5, an edge view of the core-guard and core-cutter after being bent in tubular form, looking toward the notched edge; and Fig. 6 a plan view of the blank from which the core guard and cutter are formed.

A is the slicing-knife blade formed of a single plate of steel or other suitable material, and may be secured by a screw, in the usual manner, to any machine of the class above described.

B is the straight sharpened or cutting portion of said knife, and C the cut-away portion or recess at the lower part of the sharpened points extending inward toward each other; D, my combined core-guard and core-cutter; D′, the sharpened edge which cuts the core from the apple.

$D^2\ D^3\ D^4$ are cut-away portions or recesses in that edge of the tube which is provided with the core-cutting sharpened edge. These recesses or cut-away portions are made to correspond exactly in size and location with the inwardly-projecting lugs or points $A'\ A''\ A'''$, formed upon the inner edge of the scroll forming the upper part of the slicing-knife blade.

E is a cut-away portion or recess in the core-guard adjacent to the lower edge of the slicing-knife, and has for its object to give clearance to the seeds, which might otherwise become caught between the edge of the core-cutter and the lower edge of the slicing-knife, thus creating undue friction and causing the fruit to break from the fork before the operation of the knives is completed.

I will now explain the manner of constructing my improved combined slicing and coring knife.

The tubular core-guard and core-cutter combined I prefer to make of heavy tin-plate, blanked out in the form shown in Fig. 6. I prefer to sharpen the cutting-edge D′ while the blank is in this form or before it is bent. The blank is then bent in the form shown in Fig. 5. The tube is made of such shape on its inner or notched edge as to conform with the outwardly-bent portion of the slicing-knife scroll, the inside surface of the tube being parallel on all its sides with the path of movement of the core being cut.

The slicing-knife blade having had its cutting-edge made sharp and the top portion of the blade bent outward to allow the cut slice to pass freely between the edge of the slicing-knife and its extended upper portion, is now provided with the tubular core-guard and core-cutter, which, having been formed as above described, is readily attached to the scroll part of the knife-blade by inserting the projections D″ D‴ D⁗ D⁗′, formed on the inner edge of coring-tube, into the notched portions or cut-away parts in the scroll part of the slicing-knife blade.

The recesses or cut-away parts $D^2$ $D^3$ $D^4$ in the tube are made slightly deeper than the thickness of the metal forming the slicing-knife blade. Consequently the projections formed on the inner edge of the tube protrude slightly beyond the thickness of the slicing-knife blade. This protruding edge is now upset or bent outward, as shown in the drawings, Figs. 1 and 2, thus forming a head or enlargement upon the outside of the tube proper, which effectually and firmly fastens the tube in its place and prevents its being pulled out. The projecting points on the slicing-knife blade A′ A″ A‴ extend inward past the edge of the core-guard to the extent of the thickness of the metal forming the core-guard and extending through the cut-away portions $D^2$ $D^3$ $D^4$ of the tube, the projecting parts $D^2$ $D^3$ $D^4$ effectually preventing the tube from being pushed out in the opposite direction.

The sharpened portion D′ of the tube constituting the coring-knife extends from the cutting-edge of the slicing-knife a short distance on a contour with the circle of the tube to the point or extended end of the slicing-knife blade, thus presenting a cutting-edge in scroll form or at an angle with the rotary movement of the fruit being operated upon, the angle or scroll being formed in an opposite direction from that of the extended portion of the slicing-knife blade, and the sharpened portion being of sufficient length to cut entirely through the slice of the apple.

I do not claim, broadly, a slicing-knife having an extended end bent in scroll form and having its end bent outward to conform with the thickness of the slice to be cut. Neither do I claim, broadly, the slicing-knife provided with a core-cutting tube and having its inner edge made sharp, as I am aware such a device has been shown in a patent granted to C. P. Carter, August 26, 1856, No. 15,603; but

I claim as my invention and desire to secure by Letters Patent—

1. A slicing and coring knife combining in its construction a straight slicing-knife having an extended curved end bent in scroll form to partially encircle the core, and a solid metallic tubular core-guard having that portion of its inner edge that extends from the cutting-edge of the slicing-knife to the point of the outwardly-bent scroll-extension sharpened to act as a core-cutter, substantially as described.

2. A combined slicing-knife and circular core-cutter, as described, the coring-tube having a recess formed in its edge at the point where it joins the slicing-knife, substantially as described, and for the purpose set forth.

3. A slicing and coring knife combining in its construction a straight slicing-knife and a circular core-guard and core-cutter sharpened on its inner edge, the knife provided with an opening or recess in its cutting-edge at a point where it joins the core-cutter, substantially as shown and described.

4. A combined slicing-knife and core-cutter, as described, the slicing-knife having a recess at the lower end of its sharpened edge, in combination with a coring-tube having a recess registering with the recess in the slicing-knife, substantially as shown and described.

5. A slicing-knife combining in its construction a straight slicing-knife having an extended curved end bent in scroll form to encircle the core, and having cut-away portions or recesses upon its inner edge, and a coring tube or guard having lugs or points on the edge of the tube and being located and so formed as to fit in the cut-away portions or recesses of the scroll of the slicing-knife, substantially as shown and described.

6. A slicing-knife combining in its construction a straight slicing-knife having an extended curved end bent in scroll form to encircle the core, and having cut-away portions or recesses upon its inner edge, and a coring tube or guard having lugs or points formed upon its inner edge, the lugs or points on the inner edge of the tube being located and so formed as to fit in the cut-away portions or recesses of the scroll of the slicing-knife, the points or lugs on the tube being made to protrude slightly beyond the thickness of the metal forming the slicing-knife blade, and having such raised portion turned outward or headed to fasten the tube to the slicing-knife blade, substantially as shown and described.

CHARLES E. HUDSON.

Witnesses:
E. C. WILLIAMS,
A. C. SPILL.